(12) United States Patent
Nogueiro et al.

(10) Patent No.: US 7,292,847 B2
(45) Date of Patent: Nov. 6, 2007

(54) METHOD FOR COORDINATING TASKS IN A GSM NETWORK

(75) Inventors: Luis Alfredo Alonso Nogueiro, Poing (DE); Holger Küfner, Schweinfurt (DE)

(73) Assignee: Infineon Technologies AG, Munich (DE)

( * ) Notice: Subject to any disclaimer, the term of this patent is extended or adjusted under 35 U.S.C. 154(b) by 858 days.

(21) Appl. No.: 10/455,089

(22) Filed: Jun. 5, 2003

(65) Prior Publication Data

US 2003/0224771 A1    Dec. 4, 2003

Related U.S. Application Data

(63) Continuation of application No. PCT/EP01/14125, filed on Dec. 3, 2001.

(30) Foreign Application Priority Data

Dec. 5, 2000    (EP)    .................... 00126731

(51) Int. Cl.
*H04M 3/00*    (2006.01)
(52) U.S. Cl. ........................ 455/418; 712/35
(58) Field of Classification Search ................ 455/418
See application file for complete search history.

(56) References Cited

U.S. PATENT DOCUMENTS 6,052,580 A    4/2000    Khakoo
6,347,141 B1 *    2/2002    Klein et al. ............ 379/406.08
6,631,394 B1    10/2003    Rönkkä et al.
6,665,289 B1 *    12/2003    Sebire et al. ................ 370/347

FOREIGN PATENT DOCUMENTS

| EP | 0 617 361 A2 | 9/1994 |
| EP | 0 856 951 A1 | 8/1998 |
| JP | 11-252001 | 9/1999 |
| JP | 2002-501248 A | 1/2002 |
| WO | 99/38073 | 7/1999 |

OTHER PUBLICATIONS

Jongwon, L. et al.: "Scheduling Soft Aperiodic Tasks in Adaptable Fixed-Priority Systems", Operating Systems Review, vol. 30, No. 4, Oct. 1996, pp. 17-28.

* cited by examiner

*Primary Examiner*—Fan Tsang
*Assistant Examiner*—Simon Sing
(74) *Attorney, Agent, or Firm*—Laurence A. Greenberg; Werner H. Stemer; Ralph E. Locher

(57) ABSTRACT

In a mobile unit of a GSM network (Global System for Mobile Communications), various tasks are performed under real-time constraints. After starting an execution of a first task, the execution of the first task is suspended a plurality of times for a respective plurality of time intervals. A second task is executed during at least one of the plurality of time intervals. The first and second tasks are performed by a single-core microprocessor digital signal processor with a microprocessor and a digital signal processor combined on a single chip.

9 Claims, 5 Drawing Sheets

METHOD FOR COORDINATING TASKS IN A GSM NETWORK

CROSS-REFERENCE TO RELATED APPLICATION

This application is a continuation of copending International Application No. PCT/EP01/14125, filed Dec. 3, 2001, which designated the United States and which was published in English.

BACKGROUND OF THE INVENTION

Field of the Invention

The invention relates to a method for coordinating tasks in a real-time system, and in particular to a method for coordinating GSM (Global System For Mobile Communications) protocol layer tasks and application tasks in a GSM network.

Mobile communications networks, such as the GSM network, are composed of several functional entities. The functional entities of the GSM network are typically divided into three main parts, namely a mobile station, a base station subsystem and a network subsystem. The mobile station, by way of example, is a cellular telephone carried by a subscriber. The base station subsystem controls the radio link with the mobile station. The network subsystem performs the switching of calls between mobile users and between mobile and fixed network users.

One part of the functions of the GSM network ensures the transmission of voice or data over the wireless radio link, another part of the functions of the GSM network ensures that a mobile station can roam in a geographical area covered by the GSM network. Since the geographical area covered by the GSM network is divided into cells, a handover mechanism is implemented for transferring a mobile station from one cell to another cell. In order to facilitate the various network functions, the GSM network uses a signaling protocol which can be divided into three general layers. GSM protocol layer 1 is the physical layer which uses a TDMA (time division multiple access) channel structure for the air interface between the mobile station and a base transceiver station which is part of the base station subsystem. GSM protocol layer 2 is the data link layer. GSM protocol layer 3 is itself divided into three sublayers, which include the functions of radio resources management, mobility management, and connection management.

Conventional cellular telephones or any other GSM modules used in the GSM network include at least one microcontroller (μC) and a digital signal processor (DSP) for performing various processing tasks. Conventional cellular telephones have a clear separation of responsibilities between the microcontroller (μC) and the digital signal processor (DSP). The digital signal processor (DSP) executes the tasks of signal filtering, modulation, equalization and other tasks that are part of the GSM protocol layer 1. Routines or tasks of the GSM protocol layer 1 are generally time-critical. The digital signal processor tasks of the GSM protocol layer 1 are distinguished by routines having a short duration and a short latency. Layer 1 tasks having a short duration are for example equalizing functions. The term latency is loosely defined as a delay time or response time between an initiation of a request or routine and the completion of that request or routine. The digital signal processor routines for the GSM protocol layer 1 however also include routines that take a long time to execute, such as voice encoding and voice decoding. The execution of a voice encoding or voice decoding process may for example take up to four milliseconds.

The microcontroller in a conventional cellular telephone executes routines for the GSM protocol layers 1, 2, and 3 and routines for the man-machine interface (MMI). The functions of the GSM protocol layer 1 are time-critical and must be prioritized. The GSM protocol layers 2 and 3 as well as the man-machine interface are distinguished by routines or tasks that are generally not time-critical.

Conventional cellular telephones are configured such that there is a distinctive separation of hardware as well as a functional separation between, on the one hand, the microcontroller and, on the other hand, the digital signal processor. This separation between the microcontroller and the digital signal processor ensures that highly prioritized, time-critical functions or tasks do not take up all of the processing resources. The separation of the microcontroller from the digital signal processor thus ensures that low-priority functions or functions that are not time-critical are executed in due course and on a regular basis. The above-described separation between microcontroller and digital signal processor is well established for conventional cellular telephones that are used in the GSM network.

Meanwhile, a new generation of semiconductor chips combines the capabilities of a microcontroller (μC) and the capabilities of a digital signal processor (DSP) in a single chip. Such semiconductor chips are known as single-core microcontroller-DSPs (μC-DSP) and they are optimized to meet the requirements of a variety of real-time oriented embedded control systems. These microcontroller-DSPs (μC-DSPs) are in principle suitable for replacing the microcontroller and the digital signal processor in conventional cellular telephones. Replacing the microcontroller and the digital signal processor with a single-core microcontroller-DSP saves chip area and advantageously reduces hardware interfaces.

Since it is generally desirable to reduce hardware outlay in cellular telephones, it has been suggested to use a single-core microcontroller-DSP instead of the conventional combination of a microcontroller and a separate digital signal processor. When using the single-core microcontroller-DSP (μC-DSP), the layer 1 tasks performed by the μC part of the single-core PC-DSP ("layer 1 μC") and the layer 1 tasks performed by the DSP part of the single-core μC-DSP ("layer 1DSP") are no longer separated but are performed together in the single-core μC-DSP. In other words the "layer 1 μC" and the "layer 1 DSP" are combined in a single "layer 1 μC-DSP." As explained above, the layer 1 tasks or routines are generally time-critical and have the highest priority because of their stringent real-time constraints. A single-core μC-DSP will therefore execute the GSM layer 1 routines first and will execute any upper layer routines or man-machine interface routines only after all layer 1 routines or tasks are executed.

A proper operation of the cellular telephone within the GSM network requires that the μC-DSP performs some of the upper layer routines (GSM protocol layers 2 and 3) at regular time intervals. However, since the single-core μC-DSP executes the upper layer routines or man-machine interface routines only after all layer 1 routines or tasks are executed, the upper layer routines are delayed by an unacceptably long time period. As a result, some upper layer tasks are not performed in time for a proper operation of a cellular telephone in a GSM network. Due to the conflicting requirements that must be met for the layer 1 routines and for the upper layer routines, it has so far not been possible to use a single-core µC-DSP for GSM applications.

SUMMARY OF THE INVENTION

It is accordingly an object of the invention to provide a method of coordinating tasks in a real-time system, such as the GSM network, which overcomes the above-mentioned disadvantages of the heretofore-known devices and methods of this general type and which can reliably coordinate GSM layer 1 tasks, GSM upper layer tasks, and other application tasks under real-time constraints.

With the foregoing and other objects in view there is provided, in accordance with the invention, a method of coordinating tasks in a GSM system, the method which comprises:
providing a first task selected from GSM layer 1 tasks, and providing a second task selected from GSM upper layer tasks;
providing a single-core microprocessor digital signal processor having a microprocessor and a digital signal processor combined on a single chip;
starting an execution of the first task with the single-core microprocessor digital signal processor;
suspending the execution of the first task a plurality of times for a respective plurality of time intervals; and
executing the second task with the single-core microprocessor digital signal processor during at least one of the plurality of time intervals.

In accordance with an added feature of the invention, the first task is provided a first priority, and the second task is assigned a second priority that is less than the first priority.

In accordance with an additional feature of the invention, the method comprises:
estimating a termination time of the first task to form an estimated termination time; and
suspending the execution of the first task based on the estimated termination time.

In accordance with another mode of the invention, the first task is executed uninterrupted until real-time requirements of the first task are met.

In accordance with yet another mode of the invention, the suspending step is scheduled with a real-time operating system.

As noted above, the first task and the second task are executed with a single-core µC-DSP of a mobile station in a GSM network.

In accordance with yet a further mode of the invention, the suspending step is scheduled with a real-time operating system which has interruptible system calls.

In accordance with another mode of the invention, the suspending step is scheduled with a real-time operating system, which has non-interruptible system calls. The non-interruptible system calls are in this case deterministic systems calls having a duration shorter than a latency period of the first task.

In accordance with a further mode of the invention, the first and second tasks include GSM Interrupt Service Routines, application Interrupt Service Routines, GSM Interrupt Service Threads, application Interrupt Service Threads, and application tasks. Respective priorities are assigned in a falling order to the GSM Interrupt Service Routines, the application Interrupt Service Routines, the GSM Interrupt Service Threads, the application Interrupt Service Threads, and the application tasks.

Other features which are considered as characteristic for the invention are set forth in the appended claims.

Although the invention is illustrated and described herein as embodied in a method for coordinating tasks in a GSM network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
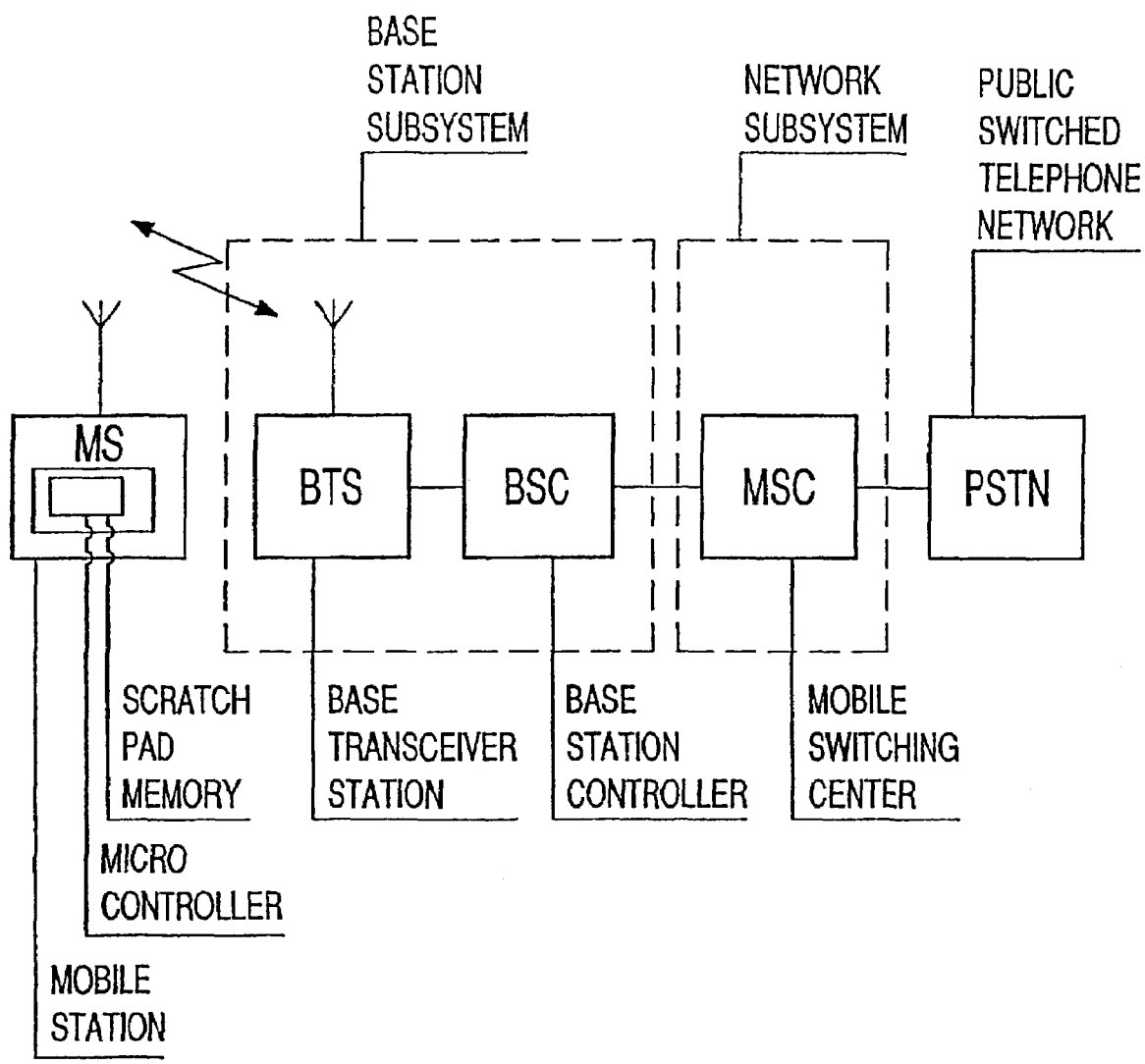
FIG. 1 is a simplified block diagram of a GSM network.

Referring now to the figures of the drawings in detail and first, particularly, to FIG. 1 thereof, there is shown a simplified block diagram of a GSM network. The GSM network is composed of several functional entities, the functions and interfaces of which are described in the GSM specifications. The GSM network can be divided into three main parts, namely a mobile station MS, a base station subsystem and the network subsystem. The mobile station MS, for example a cellular telephone, is a portable device carried by a subscriber. In accordance with the invention, the mobile station MS is equipped with a single-core µC-DSP which has a scratchpad memory. The base station subsystem controls the radio link with the mobile station MS. The network subsystem, the main part of which is the mobile switching center MSC, performs the switching of calls between the mobile users, and between mobile and fixed network users. Elements of the GSM network which are not necessary for understanding the invention are not shown in FIG. 1, such as the operations and maintenance center, which oversees the proper operation and setup of the network. The mobile station MS and the base station subsystem communicate across an air interface. The base station subsystem communicates with the mobile switching center MSC. The mobile switching center MSC is connected to a public switched telephone network PSTN.

The base station subsystem is composed of two parts, namely, the base transceiver station BTS and the base station controller BSC. The base transceiver station BTS houses the radio transceivers that define a radio cell and it handles the radio-link protocols with the mobile station MS. The central component of the network subsystem is the mobile switching center MSC, which acts like a normal switching node of the public switched telephone network PSTN and additionally provides all the functionality needed to handle a mobile subscriber, such as registration, authentication, location updating, handovers, and call routing to a roaming subscriber. The mobile switching center MSC provides the connection to the fixed public switched telephone network PSTN.

Figure 2:
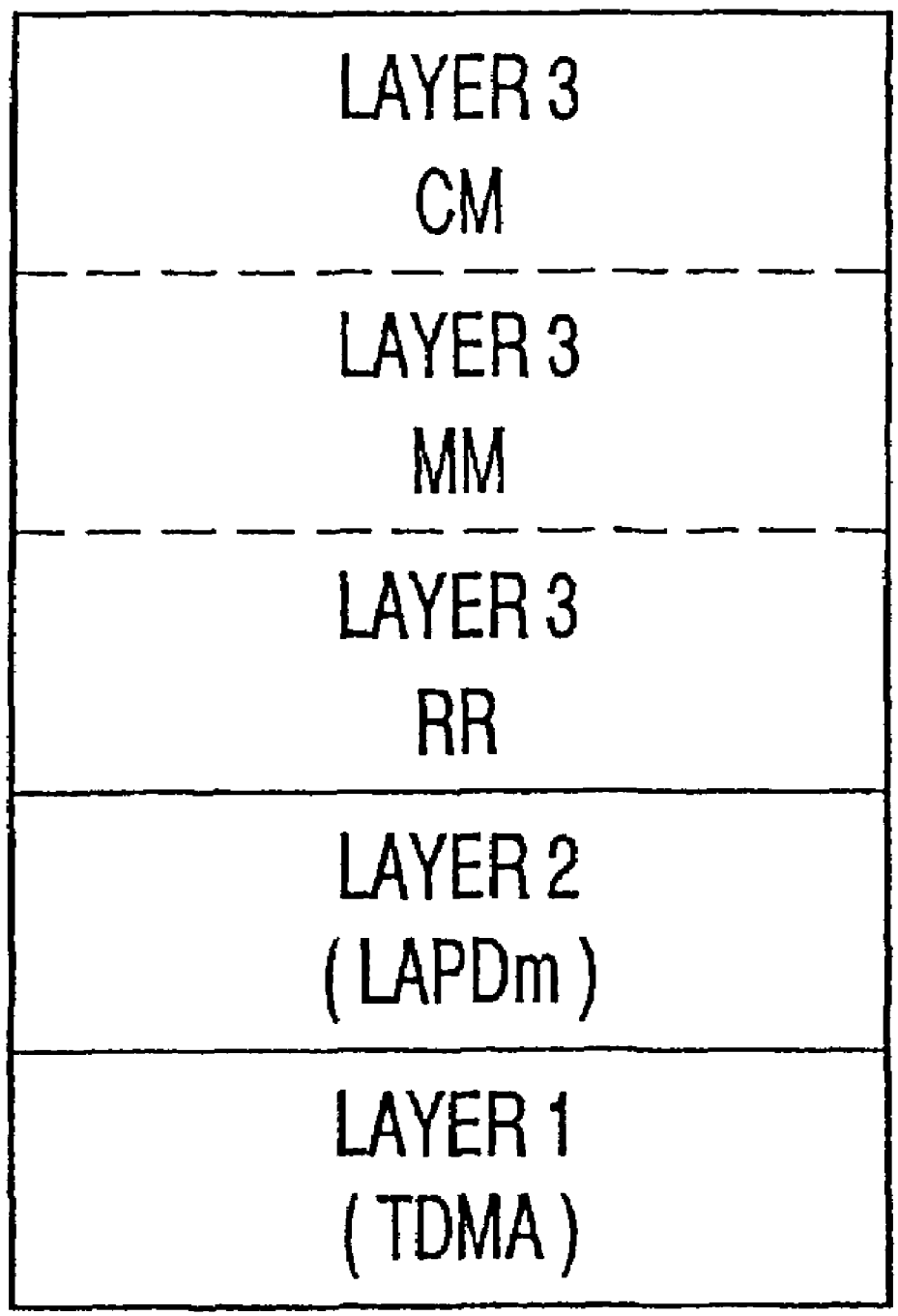
FIG. 2 is a block diagram illustrating a signaling protocol structure for a mobile station in a GSM network.

FIG. 2 is a block diagram illustrating the signaling protocol structure for the mobile station in the GSM network. Ensuring the transmission of voice or data of a given quality over the radio link is only part of the function of the GSM network. A mobile station can roam in a geographical area, which requires that functions such as registration, authentication, call routing and location updating are standardized in GSM networks. In addition, the fact that the geographical area covered by the GSM network is divided into cells necessitates the implementation of a handover mechanism. These functions are performed by the network subsystem. As can be seen in FIG. 2, the signaling protocol for the mobile station MS is structured into three general layers. Layer 1 is the physical layer, which uses a TDMA (time division multiple access) channel structure over the air interface. Layer 2 is the data link layer. Across the air interface, the data link layer uses a slight modification of the LAPD protocol (link access procedure for the D channel) used in ISDN (integrated services digital network), called LAPDm. Layer 3 of the GSM signaling protocol is itself divided into 3 sublayers. The sublayers include the radio resources management sublayer RR, the mobility management sublayer MM, and the connection management sublayer CM.

Figure 3:
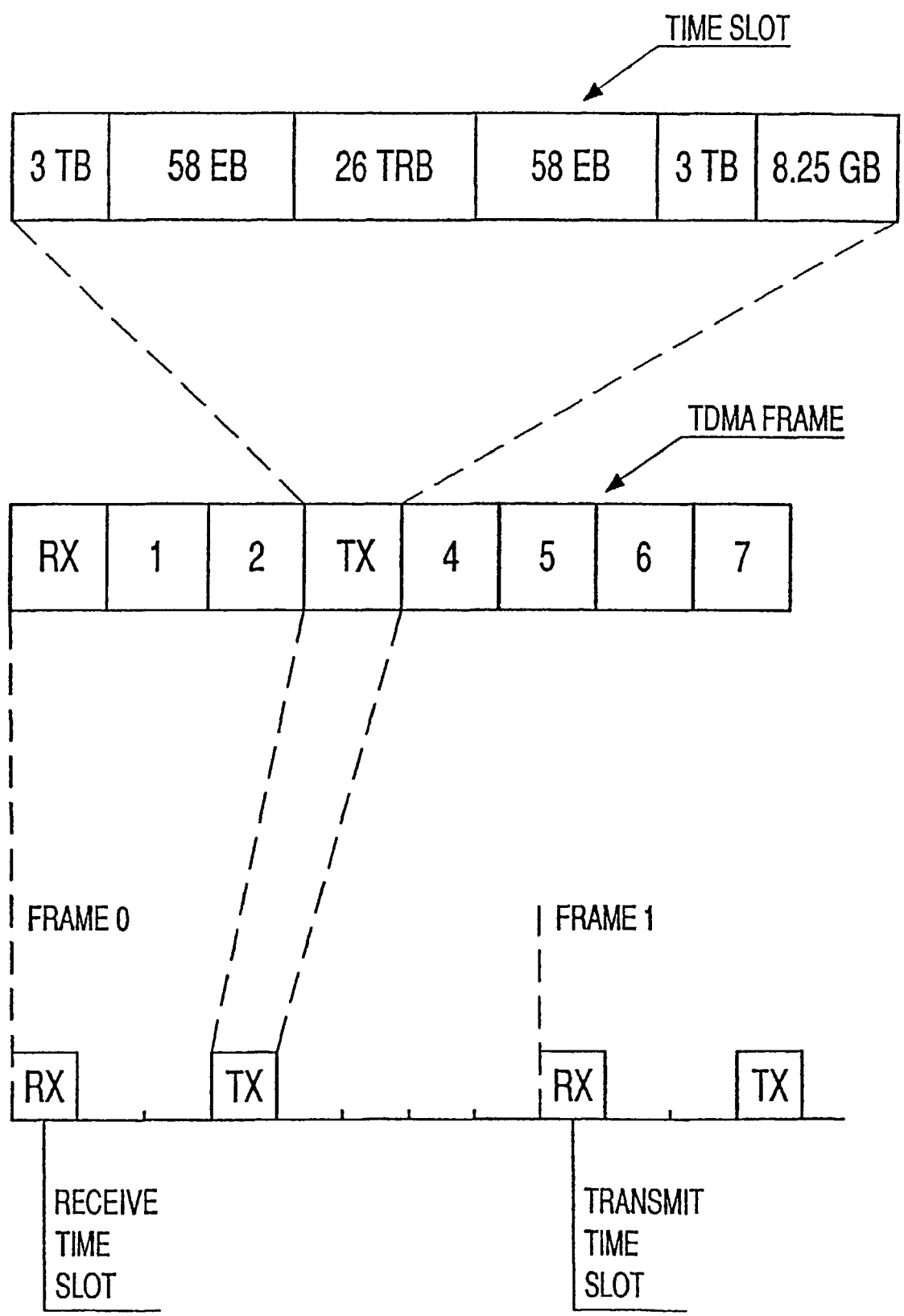
FIG. 3 is a simplified TDMA timing diagram.

FIG. 3 illustrates a simplified timing diagram of the TDMA structure used for the GSM protocol layer 1. Each TDMA frame is 4.615 milliseconds long and is divided into eight time slots (time slot 0 to time slot 7). Each time slot is 0.577 milliseconds long and holds tail bits TB, encrypted bits EB, training bits TRB, and guard bits GB.

One time slot of each TDMA frame is used for transmission by the mobile station MS and one time slot of each TDMA frame is used for reception by the mobile station MS. The transmit time slot Tx and the receive time slot Rx are separated in time so that the mobile station MS does not receive and transmit at the same time. The bottom part of FIG. 3 illustrates a TDMA frame sequence in which the time slot 0 is used as a receive time slot Rx and the time slot 3 is used a transmit time slot Tx. A total of 156.25 bits is transmitted in 0.577 milliseconds, resulting in a total bit rate of 270 kbps for the illustrated example.

TDMA frames are further grouped into multiframes to carry control signals. There are two types of multiframe, containing 26 and 51 TDMA frames, respectively. The 26-frame multiframe contains 24 traffic channels TCH and two slow associated control channels SACCH which supervise each call in progress. A fast associated control channel FACCH operates by stealing slots from a traffic channel TCH in order to transmit power control and handover-signaling messages. Several other control channels are implemented in the TDMA frames.

The GSM protocol layer 1, in its simplest form, allows only for voice transmission. A single-core µC-DSP is used to perform the operations necessary to send a user's voice over a duplex speech channel TCH/FS (traffic channel/full rate speed). The operations which must be performed by the single-core µC-DSP include for example a speech encoding (RPE-LTP, regular pulse excited—linear predictive coding), an error correction, a reordering of bits, a convolutional encoding, and an interleaving operation. A number of operations must be performed at a frequency of 50 Hz, because each 20 milliseconds a voice sample is provided for the encoding process, resulting in a data rate of 13 kbits/s. The results of these operations are encrypted and stored in a buffer. The encrypted bits have to be mapped on the TCH/FS channel (traffic channel/full rate speed). The above-mentioned operations are accordingly performed in a reverse order when incoming data is to be converted into voice signals.

The single-core µC-DSP is provided with a firmware which includes a number of routines, so-called GSM-routines, needed to accommodate the GSM network protocol. These GSM-routines include different types of routines. One type of GSM-routines are common routines which provide functionality needed by all types of speech transmission settings and data transmission settings and which must run independently from the type of CODEC (coder/decoder) used for voice encoding/decoding. Further types of GSM-routines are FS routines (Full Rate Speech) which implement the GSM full rate speech standard. EFR routines (Enhanced Full rate Routines) are provided for use with modern codecs and HS routines (Half Rate Speech) are provided for an operation with a reduced bandwidth. The GSM routines further include AMR routines (AMR=Adaptive Multi-Rate).

The different types of routines include so-called int-0 interrupt handlers and int-1 interrupt handlers which are non-interruptible and have the highest priority. The voiceband interrupt is an example of an int-0 interrupt handler, int-2 interrupt handlers can only be interrupted by int-0 and int-1 interrupt handlers. The rest of the routines are non-entrant tasks and do not run in interrupt handlers. In order to schedule the tasks or routines, an algorithm is used. Each task is identified by a number which indicates the priority of the task. The algorithm uses a global status word variable, where individual bits indicate which tasks have to be executed. The individual bits can be set by interrupt handlers or by other tasks. For example, the voiceband interrupt can start the speech and channel encoders or, the equalizer can start the channel and speech decoders. The above-described algorithm schedules the GSM routines and is therefore also called a "GSM scheduler". The GSM scheduler is, in its simplest form, a loop which examines the global status word variable and calls the routine with the highest priority that is ready to be performed. The called routine will get the CPU (Central Processing Unit) until it returns. The called routine will be interrupted by other interrupt handlers but will not be interrupted by other tasks.

A real-time operating system or short RTOS, preferably a commercially available RTOS, is used to schedule and control the single-core µC-DSP. The RTOS must be able to comply with the real-time requirement of the GSM protocol layer 1.

Figure 4:
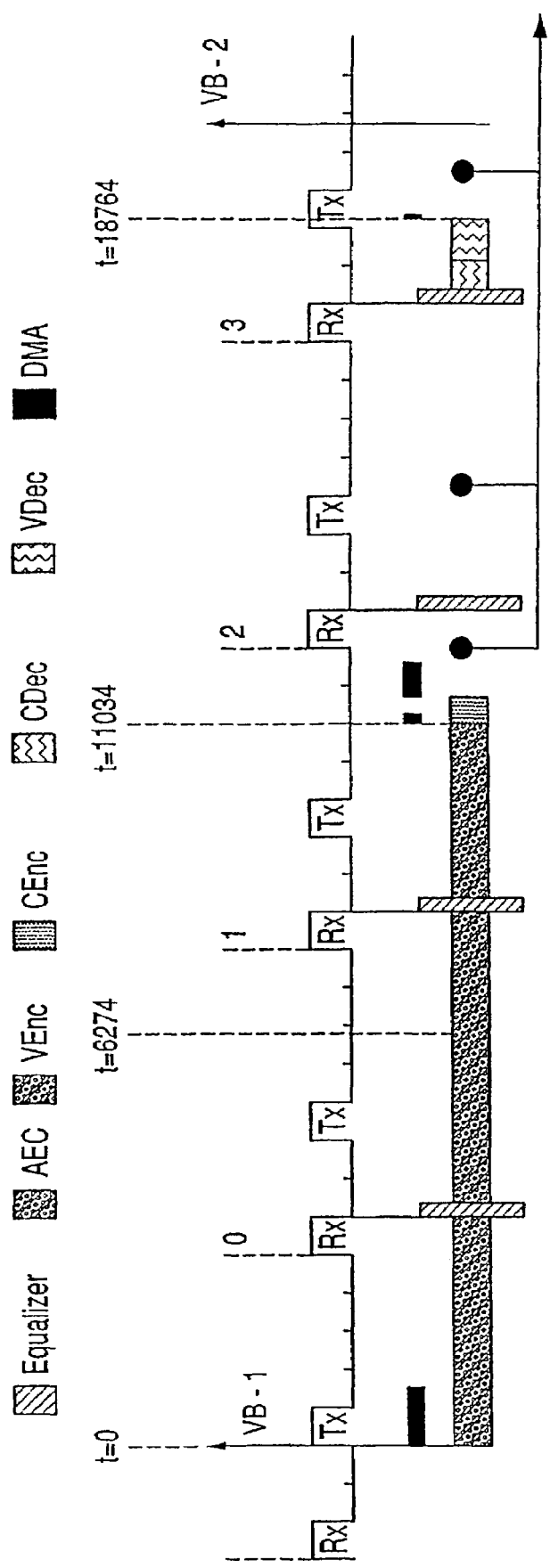
FIG. 4 is a timing diagram illustrating an operation of a single-core µC-DSP without using the method according to the invention.

In order to explain the method according to the invention, first the operation of a single-core µC-DSP without using the method according to the according to the invention (GSM scheduler) is explained with reference to FIG. 4. FIG. 4 shows a series of TDMA frames, each frame having eight time slots. The first time slot of each TDMA frame is the transmit time slot Tx, the sixth time slot in each TDMA frame is the receive time slot Rx. The run times of various GSM routines, which are performed by the µC-DSP, are indicated. AEC indicates an asynchronous echo cancellation routine. VEnc indicates a voice encoding routine, CEnc indicates a channel encoding routine, CDec indicates a channel decoding routine, VDec indicates a voice decoding routine, DMA indicates a direct memory access routine, Equalizer indicates an equalizing routine. Some of the GSM routines or application tasks, such as the voice encoding and the voice decoding have long run times.

Since the single-core µC-DSP executes the upper layer routines or man-machine interface routines only after all layer 1 routines or tasks are executed, the upper layer routines are delayed by an unacceptably long time period. As a result, some upper layer tasks are not performed in time for a proper operation of a cellular telephone which is equipped with a single-core μC-DSP. FIG. 4 illustrates that no upper layer tasks can be performed for a period of more than two TDMA frames. The periods during which no layer 1 routines are performed and during which upper layer tasks may be performed are indicated by three dots.

The method according to the invention solves the problem of coordinating layer 1 routines and upper layer tasks by monitoring and scheduling operations which cause the layer 1routines to release the μC-DSP at regular intervals. Thus the μC-DSP is available for performing upper layer tasks during these time intervals. The upper layer tasks and other routines can be performed during these free intervals. As a consequence, the upper layer tasks, MMI (man machine interface) routines and any other tasks performed during these time intervals exhibit a certain degree of real-time behavior. In effect, the method according to the invention performs the upper layer tasks as if they were performed by a separate microcontroller. The method according to the invention provides a so-called "logical microcontroller" for the upper layer tasks.

Figure 5:
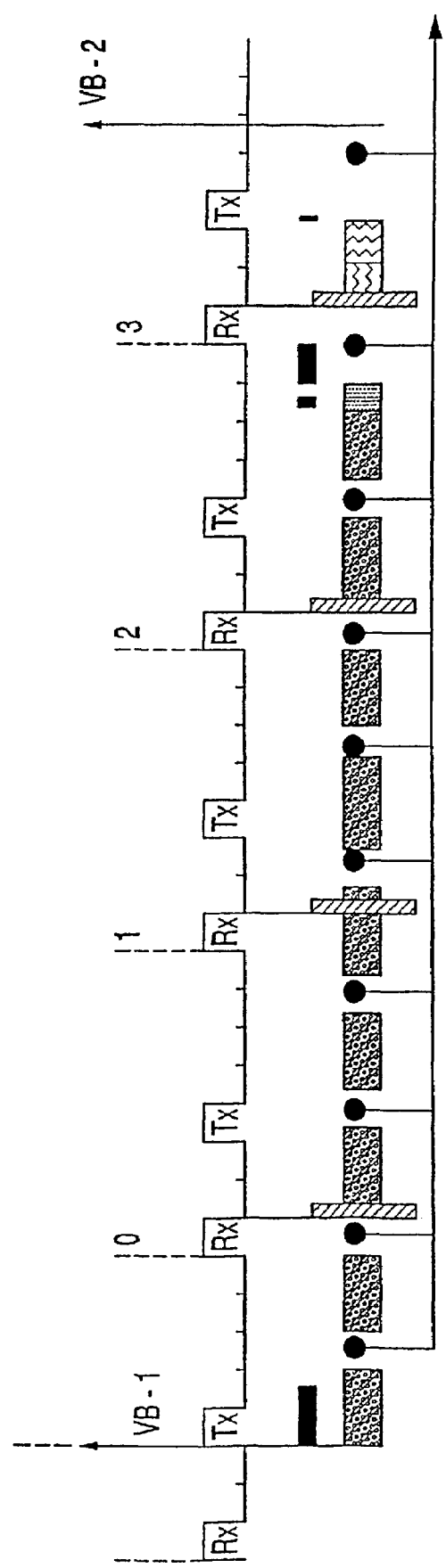
FIG. 5 is a timing diagram illustrating an operation of a single-core µC-DSP using the method according to the invention.

FIG. 5 illustrates the method according to the invention. FIG. 5 shows a series of TDMA frames, each frame having eight time slots. The first time slot (time slot 0) of each TDMA frame is the transmit time slot Tx, the sixth time slot (time slot 5) in each TDMA frame is the receive time slot Rx. The run times of various GSM routines, which are performed by the μC-DSP, are indicated along the time axis. AEC indicates an asynchronous echo cancellation routine. VEnc indicates a voice encoding routine, CEnc indicates a channel encoding routine, CDec indicates a channel decoding routine, VDec indicates a voice decoding routine, DMA indicates a direct memory access routine, Equalizer indicates an equalizing routine.

The method according to the invention uses the above-mentioned "GSM scheduler" which is a superordinated task. This GSM scheduler resumes and suspends the layer 1 tasks to produce the behavior of the "logical microcontroller." The periods during which no layer 1 routines are performed and during which upper layer tasks, MMI tasks or other tasks may be performed are indicated by dots. FIG. 5 illustrates that layer 1 routines are suspended and resumed at regular time intervals. Suspending and resuming the layer 1 routines provides time periods during which upper layer tasks can be performed. From FIG. 5 it can be seen that the method according to the invention provides several time periods per TDMA frame during which upper layer tasks can be performed. The GSM tasks are scheduled (interrupted and restored) such that application tasks get enough processor time at regular time intervals.

The scheduling operations according to the invention are performed by the GSM scheduler, which is preferably loaded as a superordinated task in a Scratchpad RAM (random access memory) of the single-core μC-DSP. This ensures the correct timing of critical routines without having to rely on a cache memory.

The GSM scheduler performs a real-time monitoring of the execution of GSM tasks. Due to the real-time requirements that must be met, the GSM scheduler runs at the highest priority. The GSM scheduler may be provided such that it runs in a time-slice mode or in a non-interruptible mode.

In the time-slice operating mode, the GSM scheduler performs the following tasks:
sending messages to start a GSM task;
setting a timer and estimating a termination time of a GSM task;
suspending itself when a GSM task is running;
suspending a running task or resuming a suspended task based on timer information;
switching into a non-interruptible mode if a termination time is exceeded, in other words partially disabling itself; and
receiving a message from a GSM task when the GSM task is ready to be performed.

In the non-interruptible mode, the GSM scheduler performs the following tasks:
disabling application interrupts;
run pending GSM tasks without interruption until the GSM tasks are in time and meet the real-time requirements; and
switching into the time-sliced mode.

In order to properly perform both, time-critical GSM layer 1 routines and upper layer routines or application tasks, the method according to the invention, in other words the GSM scheduler, must meet a number of requirements.

Firstly, it is important to be able to interrupt the application tasks which are currently executing a system call. Otherwise, once an application task has started a system call, it is not possible to start a time-critical routine, such as a GSM layer 1 routine, during the latency time of the application tasks. Two solutions are provided for this problem.

(A) All system calls are provided as deterministic calls and their duration is very short (not more than about 10 microseconds). This requirement can be expressed as a latency condition for a non-interruptible RTOS (real-time operating system) to be used for the method according to the invention. The latency condition is defined as:

$$\text{duration(system\_call)} + \text{latency(GSM\_timer\_ISR)} \leq \text{shortest\_GSM\_latency} \approx 10 \text{ microseconds}$$

In other words, the duration of a system call plus the latency duration of an interrupt service routine ISR is not longer than the shortest latency duration of a critical GSM routine, which is about 10 microseconds.

(B) System calls are provided as interruptible calls. As mentioned above, an RTOS (real-time operating system) is used to schedule and control the single-core μC-DSP and in this case the RTOS must provide interruptible system calls.

Secondly, GSM routines that perform the speech encoding and the speech decoding have generally very long run times. While the speech encoding or speech decoding is performed, no application tasks can be performed. In accordance with the invention, the execution of the speech encoding and of the speech decoding is interrupted on a regular basis, in order to allow the execution of application tasks. The interruption of the speech encoding and speech decoding routines is implemented by using so-called ISTs (interrupt service threads) or RTOS tasks.

The GSM protocol layer 1 in the RTOS is structured such that the GSM constraints can be fulfilled. In particular, GSM routines have medium to very short latency times. Routines with very short latency times are implemented as interrupt service routines (ISRs) or interrupt service threads (ISTs).

ISRs are interrupt handlers and cannot execute system calls. No task is executed as long as any ISR execution is pending. ISTs are similar to user tasks and they may execute any system call. ISTs have a higher priority than any other application task. Routines having a medium latency time such as speech and channel codecs are preferably implemented as RTOS tasks.

In order to meet the real-time constraints of the GSM network, the method according to the invention also assigns respective priorities to the various tasks to be performed by the μC-DSP. A high priority is assigned to ISRs for power management, emergency modes etc.. Next in terms of priority are ISRs for GSM firmware routines, such as VB (voice band), equalization routines, monitoring routines, and FCB (frequency correction burst) routines. Next are ISRs for standard applications and below those, in terms of priority, are certain GSM scheduling functions such as scheduling GSM tasks in order to enable application tasks to get processor time, loading GSM tasks into the Scratchpad memory, or making sure that the GSM firmware is running under all circumstances. Low priorities are assigned to some application routines such as idle routines. The respective priority classes of the system can be expressed by the following relation:

GSM_ISR>App_ISR>GSM_IST>App_IST>App_task

In other words, application ISRs (App_ISR) have a lower priority than GSM ISRs (GSM_ISR) and thus they are allowed to interrupt the speech/channel decoders/encoders only for a short period of time. After performing tasks such as reading from or writing to registers of hardware devices, the application ISRs (App_ISR) exit and inform or signal the application ISTs (App_IST) that some operations need to be performed. However, as can be seen from the above relation, application ISTs (App_IST) can be executed only when no GSM ISRs (GSM_ISR) or GSM ISTs (GSM_ISTs) are ready to run, since GSM ISRs and GSM ISTs take precedence over application ISTs.

We claim:

1. A method of coordinating tasks in a GSM system, the method which comprises:
providing a first task including GSM layer 1 tasks, and providing a second task including GSM upper layer tasks;
providing a single-core microprocessor digital signal processor having a microprocessor and a digital signal processor combined on a single chip;
providing a GSM scheduler and scheduling the following operations with the GSM scheduler:
starting an execution of the first task with the single-core microprocessor digital signal processor;
suspending the execution of the first task a plurality of times for a respective plurality of time intervals; and
executing the second task with the single-core microprocessor digital signal processor during at least one of the plurality of time intervals; and
selectively running the GSM scheduler in a time-slice mode or in a non-interruptible mode, wherein the GSM scheduler performs the following tasks in the time-slice mode:
sending messages to start a GSM task;
setting a timer and estimating a termination time of a GSM task;
suspending itself when a GSM task is running;
suspending a running task or resuming a suspended task based on timer information;
switching into a non-interruptible mode if a termination time is exceeded: and
receiving a message from a GSM task when the GSM task is ready to be performed; and
wherein the GSM scheduler performs the following tasks in the non-interruptible mode:
disabling application interrupts;
run pending GSM tasks without interruption until the GSM tasks are in time and meet the real-time requirements; and
switching into the time-slice mode.

2. The method according to claim 1, which comprises:
assigning a first priority to the first task; and
assigning a second priority to the second task, the first priority being a higher priority than the second priority.

3. The method according to claim 1, which comprises:
estimating a termination time of the first task to form an estimated termination time; and
suspending the execution of the first task based on the estimated termination time.

4. The method according to claim 1, which comprises executing the first task without interruption until real-time requirements of the first task are met.

5. The method according to claim 1, which comprises scheduling the suspending step with a real-time operating system.

6. The method according to claim 1, which comprises scheduling the suspending step with a real-time operating system having interruptible system calls.

7. The method according to claim 1, which comprises:
scheduling the suspending step with a real-time operating system having non-interruptible system calls; and
providing the non-interruptible system calls as deterministic systems calls having durations shorter than a latency period of the first task.

8. The method according to claim 1, which comprises:
providing, as the first and second tasks, a GSM Interrupt Service Routine, an application Interrupt Service Routine, a GSM Interrupt Service Thread, an application Interrupt Service Thread, and an application task; and
assigning respective priorities in a descending order to the GSM Interrupt Service Routine, the application Interrupt Service Routine, the GSM Interrupt Service Thread, the application Interrupt Service Thread, and the application task, respectively.

9. The method according to claim 1, which comprises loading the GSM scheduler as a superordinated task in a RAM of the single-core microprocessor digital signal processor.

* * * * *